United States Patent
Nishi

(10) Patent No.: US 7,318,213 B2
(45) Date of Patent: Jan. 8, 2008

(54) APPARATUS, METHOD AND PROGRAM FOR BEHAVIORAL SYNTHESIS INCLUDING LOOP PROCESSING

(75) Inventor: Hiroaki Nishi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 329 days.

(21) Appl. No.: 11/230,632

(22) Filed: Sep. 21, 2005

(65) Prior Publication Data

US 2006/0288337 A1    Dec. 21, 2006

(30) Foreign Application Priority Data

Jun. 17, 2005    (JP)  ............................. 2005-178372

(51) Int. Cl.
*G06F 17/50* (2006.01)
(52) U.S. Cl. ....................................... 716/18
(58) Field of Classification Search .................... None
See application file for complete search history.

(56) References Cited

U.S. PATENT DOCUMENTS 6,052,518 A    4/2000 Shigeta et al.
6,745,160 B1 * 6/2004 Ashar et al. .................. 703/14
2004/0237056 A1    11/2004 Okada

FOREIGN PATENT DOCUMENTS

JP    2004-326463    11/2004

OTHER PUBLICATIONS

Markus Weinhardt, "Pipeline Synthesis and Optimization for Reconfigurable Custom Computing Machines", Jan. 3, 1997, pp. 1-9.

* cited by examiner

*Primary Examiner*—Leigh M. Garbowski
(74) *Attorney, Agent, or Firm*—Oblon, Spivak, McClelland, Maier & Neustadt, P.C.

(57) ABSTRACT

A behavioral synthesis apparatus includes a control data flow graph generator that generates a CDFG specifying an execution order of calculations written in a behavior description including an external loop processing that includes internal loops processing which does not expand the internal loops processing, a scheduling module carries out scheduling of calculations, and an assigning module divides first pipeline processing for implementing the external loop processing and second pipeline processing for implementing the internal loops processing into stages, and assigns pipeline registers to the external loop processing and the internal loops processing.

20 Claims, 12 Drawing Sheets

FIG. 2

```
short x[N];
short y[N];          ⎫
short z[N];          ⎬  DECLARATION SECTION
short f[N];          ⎭
short g[N];
short h[N];

void main () {
    for(short i=0; i<N; i++) {
    a(i);                       ⎫
    b(i);                       ⎬  MAIN PROGRAM SECTION
    c(i);                       ⎭
    }
......
}
void a(int i) {
  x[i]=f[i]*g[i];
  return;
} void b(short i) {
  y[i]=x[i]/8;
  return;                       ⎫
}                               ⎬  FUNCTION DEFINITION SECTION
                                ⎭
void c(short i) {
  for(short j=0; j<M; j++) {
      z[j]=y[j] - x[j]* h[j];
  }
return;
}
```

FIG. 7

| OPERATIONAL UNIT | OPERATOR | MAXIMUM DELAY(ns) | SIZE | FUNCTION |
|---|---|---|---|---|
| ADD16S | + | 8 | 10 | ADDITION OF SIGNED 16 BITS |
| MUL16S | * | 19 | 50 | MULTIPLICATION OF SIGNED 16 BITS |
| GE16S | $\geq$ | 5 | 9 | 16-BIT COMPARISON |
| SHRA3S | /8 | 4 | 3 | SHIFT 3-BITS TO RIGHT |
| Rd_xa | RIGHT SIDE MEMBER x[i] | 6 | 3 | READ FROM ONE DIMENSIONAL ARRAY x[i] |
| Wt_xa | LEFT SIDE MEMBER x[i] | 5 | 3 | WRITE TO ONE DIMENSIONAL ARRAY x[i] |

FIG. 8

| OPERATOR / BEHAVIORAL STEP | = | $\geq$ | + |
|---|---|---|---|
| ST101 | Write_0 | | |
| ST102 | | GE16S | ADD16S |

FIG. 9

| BEHAVIORAL STEP \ OPERATOR | f[i] (INPUT) | g[i] (INPUT) | * | /8 | x[i] (OUTPUT) | y[i] (OUTPUT) |
|---|---|---|---|---|---|---|
| ST110 | Rd_fa | Rd_ga | | | | |
| ST111 | | | MUL16S | | | |
| ST112 | | | | SHRA3S | Wt_xa | |
| ST113 | | | | | | Wt_ya |

FIG. 10

| BEHAVIORAL STEP \ OPERATOR | = | $\geq$ | + |
|---|---|---|---|
| ST120 | Write_0 | | |
| ST121 | | GE16S | ADD16S |

FIG. 11

| BEHAVIORAL STEP \ OPERATOR | xt (INPUT) | yt (INPUT) | h[i] (INPUT) | * | - | z[i] (OUTPUT) |
|---|---|---|---|---|---|---|
| ST130 | Rd_xt | Rd_yt | Rd_ha | | | |
| ST131 | | | | MUL16S | | |
| ST132 | | | | | SUB16S | Wt_za |
| ST133 | | | | | | Wt_za |

FIG. 14

```
if(Step_state==ST120) {
   cntrl_SEL=1;//TURN ON CONTROL SIGNAL SO AS TO SELECT VALUE IN REGISTER r0
} else if(Step_state==ST121) {
  cntrl_SEL=1;//TURN ON CONTROL SIGNAL SO AS TO SUBSTITUTE RESULT OF ADD 16s ADDING TO REGISTER rj
  if(r_GE16S==0)//RESULT OF GE16S IS FALSE
    Step_state=ST120;  //SUBSTITUTE STEP STATE SIGNAL WITH ST120 (SHIFT TO STATE ST120)
  else
    Step_state=ST121;  //SUBSTITUTE STEP STATE SIGNAL WITH ST121
        }
} if(Step_state==ST130) {
   cntrl_rh=1;//TURN ON CONTROL SIGNAL SO AS TO SELECT THE VALUE IN REGISTER rh
   cntrl_rxt=1;//TURN ON CONTROL SIGNAL SO AS TO SELECT THE VALUE IN REGISTER rxt
   cntrl_ryt=1;//TURN ON CONTROL SIGNAL SO AS TO SELECT THE VALUE IN REGISTER ryt
} else if(Step_state==ST131) {
   cntrl_rm=1;//TURN ON CONTROL SIGNAL SO AS TO SUBSTITUTE RESULT OF MULTIPLICATION (MUL 16s)
   FOR THE CONTENT OF REGISTER rm
} else if(Step_state==ST132) {
   cntrl_rs=1;//TURN ON CONTROL SIGNAL SO AS TO SUBSTITUTE RESULT OF SUBTRACTION (SUB 16s)
   FOR THE CONTENT OF REGISTER rs
} else if(Step_state==ST133) {
   cntrl_Wt_za=1;//TURN ON CONTROL SIGNAL SO AS TO SUBSTITUTE THE VALUE OF rs FOR THE CONTENT OF RAMz
```

FIG. 15

```
if(rj == 0) {//EXECUTE ONLY STGC1
    EXECUTE SUBSTITUTION IN
    STEP ST130 USING VALUE OF rj=0
    TRANSFER VALUE OF rxt TO PIPELINE REGISTER prxt
    TRANSFER VALUE OF rxt TO PIPELINE REGISTER pryt
    TRANSFER VALUE OF rh TO PIPELINE REGISTER prh
} if(rj>0 && rj<N) {//EXECUTE IN PARALLEL STGC1 AND STGC2
    CARRY OUT PROCESSING IN STEP ST130
    USING CURRENT VALUE OF rj
    TRANSFER VALUE OF rxt TO PIPELINE REGISTER prxt
    TRANSFER VALUE OF ryt TO PIPELINE REGISTER pryt
    TRANSFER VALUE OF ry TO PIPELINE REGISTER prh
    CARRY OUT PROCESSING IN STEPS ST131, ST132, AND ST133
    USING VALUE OF rpj(rj_1)
} if(rj == N-1) {//EXECUTE ONLY STGB
    CARRY OUT PROCESSING IN STEPS ST131, ST132, AND ST133
    USING VALUE OF rj (USING prj=rj)
    }
}
```

```
z[0] = y[i]-x[i]*h[0];
z[1] = y[i]-x[i]*h[1];
z[2] = y[i]-x[i]*h[2];
z[3] = y[i]-x[i]*h[3];
z[4] = y[i]-x[i]*h[4];
z[5] = y[i]-x[i]*h[5];
z[6] = y[i]-x[i]*h[6];
z[7] = y[i]-x[i]*h[7];
z[8] = y[i]-x[i]*h[8];
z[9] = y[i]-x[i]*h[9];
```

APPARATUS, METHOD AND PROGRAM FOR BEHAVIORAL SYNTHESIS INCLUDING LOOP PROCESSING

CROSS REFERENCE TO RELATED APPLICATIONS AND INCORPORATION BY REFERENCE

This application is based upon and claims the benefit of priority from prior Japanese Patent Application P2005-178372 filed on Jun. 17, 2005; the entire contents of which are incorporated by reference herein.

BACKGROUND OF THE INVENTION

1. Field of the Invention

The present invention relates to behavioral synthesis technology. More specifically, it relates to a behavioral synthesis apparatus, an automatic behavioral synthesis method, and a behavioral synthesis program including loop processing.

2. Description of the Related Art

A behavioral synthesis apparatus of a computer system synthesizes a register transfer level (RTL) hardware description (hereafter referred to as 'RTL description') from a behavior description using a method described forthwith. A control data flow graph (CDFG) is created based on circuit behavior descriptions. 'CDFG' denotes a graph specifying the order of calculations and data accesses for a circuit behavior written in the behavior description. Steps of executing the calculations in the CDFG are determined. Registers that store data and operational units that execute the calculations in the CDFG are also determined. Afterwards, data paths and control circuits such as state machines or the like are generated so as to synthesize the RTL descriptions.

In a case where loop processing is written in the behavior description loops many times, the number of calculations to be executed in the loop increases. Therefore, the time required for loop processing by synthesized circuits increases. Accordingly, it is necessary to reduce time for loop processing in order to synthesize circuits that operate at high speed.

Loop processing is typically carried out as pipeline processing. Accordingly, synthesis of RTL descriptions for high-speed execution of pipeline processing is necessary to reduce time for loop processing.

A method of synthesizing a pipeline circuit by generating a CDFG including a control unit that assigns each loop processing to stages of pipeline processing (hereafter simply referred to as 'stages') and controls processing in each stage is available as a method of synthesizing RTL descriptions including pipeline processing. However, the above-mentioned method fails to include a behavioral synthesis method for behavior descriptions of multiple loop processing.

'Multiple loop processing' performs another loop processing while a loop is processing. Another loop processing executed during a current loop processing is hereafter referred to as 'internal loop processing'. Furthermore, a loop processing including internal loop processing is referred to 'external loop processing'. In the related art, a pipeline circuit for executing external loop processing is synthesized after the internal loop processing is expanded. In other words, the internal loop processing is not carried out during pipeline processing. Therefore, the number of cycles (pipeline pitch) necessary for a single stage of pipeline processing is increased. As a result; reducing the working speed of the circuits synthesized according to the behavior descriptions, including multiple loop processing, has been a problem.

SUMMARY OF THE INVENTION

An aspect of the present invention inheres in a behavioral synthesis apparatus. The apparatus includes a control data low graph generator configured to generate a control data flow graph. The control data flow graph specifies an execution order of a plurality of calculations written in a behavior description, including an external loop processing without expanding the internal loop processing. The external loop processing also includes an internal loop processing. A scheduling module is configured to carry out scheduling of the plurality of calculations based on the control data flow graph. An assigning module is configured to divide first pipeline processing, which implements the external loop processing, and second pipeline processing, which implements the internal loop processing, into a plurality of stages based on scheduling results, and to assign a plurality of pipeline registers to store data transferred among the plurality of stages to the external loop processing and the internal loop processing.

Another aspect of the present invention inheres in a computer implemented behavioral synthesis method. The method includes generating a control data flow graph specifying an execution order of a plurality of calculations written in a behavior description including an external loop processing that includes an internal loop processing, without expanding the internal loop processing; carrying out scheduling of the plurality of calculations based on the control data flow graph; dividing first pipeline processing, which implements the external loop processing, and second pipeline processing, which implements the internal loop processing, into a plurality of stages based on scheduling results; and assigning a plurality of pipeline registers, which store data transferred among the plurality of stages, to the external loop processing and the internal loop processing.

Still another aspect of the present invention inheres in a computer program product configured to be executed by a computer for synthesizing circuits from behavioral descriptions. The computer program product includes instructions configured to generate a control data flow graph specifying an execution order of a plurality of calculations written in a behavior description including an external loop processing, which includes an internal loop processing, without expanding the internal loop processing; instructions configured to carry out scheduling of the plurality of calculations based on the control data flow graph; instructions configured to divide the first pipeline processing, which implements the external loop processing, and the second pipeline processing, which implements the internal loop processing, into a plurality of stages based on scheduling results; and instructions configured to assign a plurality of pipeline registers, which store data transferred among the plurality of stages, to the external loop processing and the internal loop processing.

BRIEF DESCRIPTION OF DRAWINGS

FIG. 2 shows an exemplary behavior description to which an automatic behavioral synthesis method is applied, according to the embodiment of the present invention;

FIG. 7 is a table showing allocation results using the automatic behavioral synthesis method, according to the embodiment of the present invention;

FIG. 8 is a table showing schedule results using the automatic behavioral synthesis method, according to the embodiment of the present invention;

FIG. 9 is a table showing schedule results using the automatic behavioral synthesis method, according to the embodiment of the present invention;

FIG. 10 is a table showing schedule results using the automatic behavioral synthesis method, according to the embodiment of the present invention;

FIG. 11 is a table showing schedule results using the automatic behavioral synthesis method, according to the embodiment of the present invention;

FIG. 14 shows an example of an RTL description generated using the automatic behavioral synthesis method, according to the embodiment of the present invention;

FIG. 15 shows an example of an RTL description generated using the automatic behavioral synthesis method, according to the embodiment of the present invention;

DETAILED DESCRIPTION OF THE INVENTION

Figure 1:
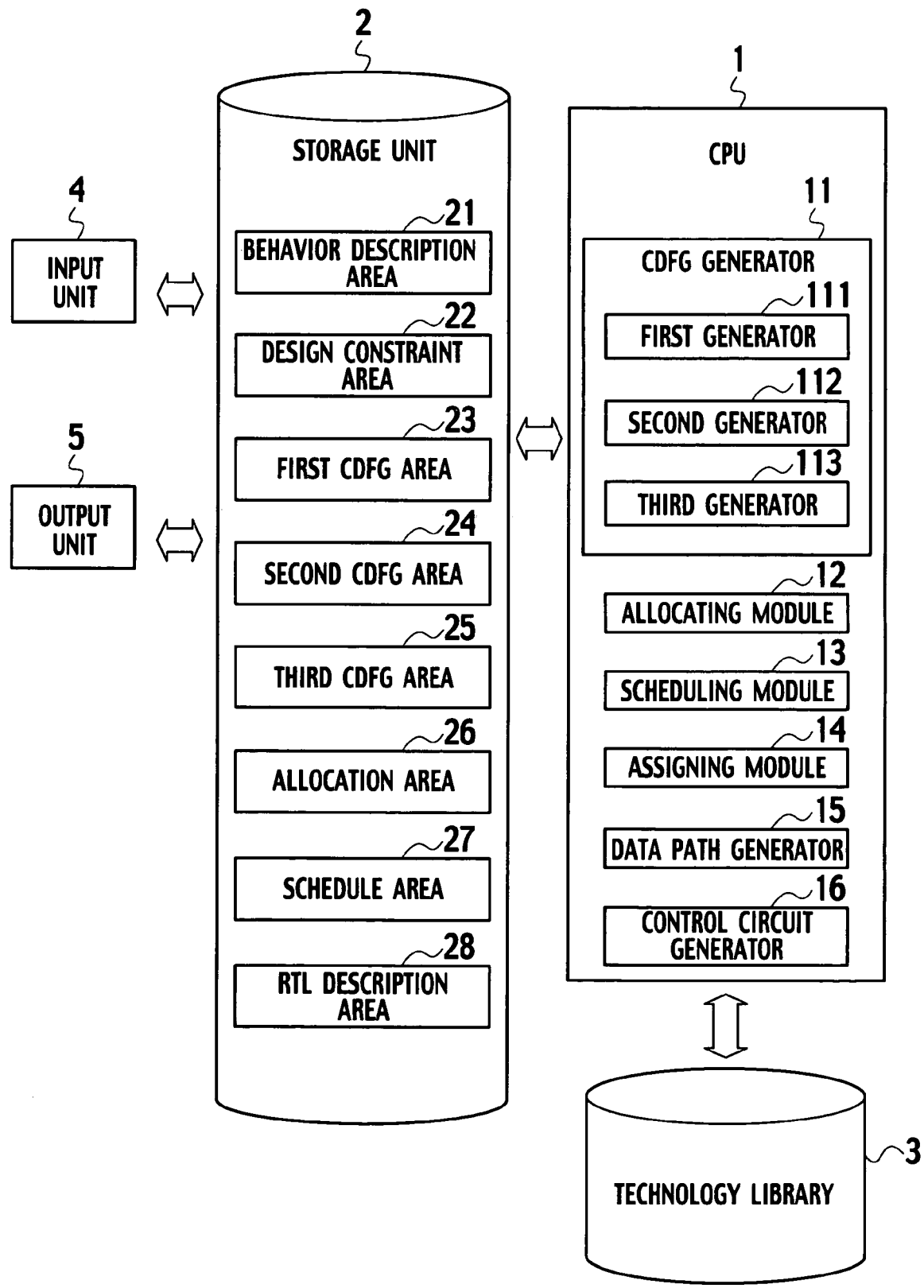
FIG. 1 is a schematic diagram showing a structure of a behavioral synthesis apparatus, according to an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In the following descriptions, numerous specific details are set forth such as specific signal values, etc., to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

As shown in FIG. 1, a behavioral synthesis apparatus, according to the embodiment of the present invention, comprises a CDFG generator 11, a scheduling module 13, and an assigning module 14. The CDFG generator 11 generates a CDFG specifying an execution order of a plurality of calculations written in behavior descriptions including external loop processing. The external loop processing includes non-expanded internal loop processing. The scheduling module 13 carries out scheduling of the calculations based on the CDFG. The assigning module 14 divides a first pipeline processing, which implements the external loop processing, and a second pipeline processing, which implements the internal loop processing, into a plurality of stages, based on scheduling results. The assigning module 14 also assigns a plurality of pipeline registers, which respectively store data transferred among the stages, to the external loop processing and the internal loop processing.

The CDFG is generated based on analysis of data flow and control flow that is written in the behavior descriptions. The CDFG comprises 'nodes' indicating calculations, functions, or the like, and 'branches' indicating data flow. As described later, for example, an operational unit is assigned to a node in the CDFG and a register for storing data is assigned to a branch so as to synthesize an RTL description.

The scheduling module 13 determines steps for executing the calculations at each of the nodes in the CDFG (hereafter referred to as 'behavioral steps') in consideration of the time required for executing the calculations at each of the nodes and the order of processing the calculations.

The behavioral synthesis apparatus in FIG. 1 further comprises an allocating module 12, a data path generator 15, and a control circuit generator 16.

The allocating module 12 extracts or selects hardware to complete processing within a single system clock cycle, such as an operational unit, a register, memory and the like from a technology library 3. The allocating module 12 selection or extraction of hardware to be assigned to the CDFG is hereafter referred to as 'allocation'. In this case, a 'system clock cycle' is a period of a system clock generated by behavioral synthesis. For example, in the case where a system clock cycle is set to 20 nsec, the allocating module 12 extracts an operational unit having a maximum signal delay of 20 nsec or less for executing the calculation. The assigning module 14 assigns the hardware extracted by the allocating module 12 to the CDFG.

The technology library 3 stores information of various operational units, multiplexers, registers, memory and the like that are applicable to behavior synthesis. Here, 'information' of operational units and the like includes delay time due to calculations, operational unit size, calculating function, and the like.

The data path generator 15 generates a multiplexer for switching over reception, and a register for storing data. The data path generator 15 generates data paths mutually connecting hardware, such as an operational unit, multiplexer, register, and the like.

The control circuit generator 16 generates a control circuit such as a state machine for controlling execution of the behavioral steps. 'State machine' denotes a circuit in which a subsequent state and output signal values are determined according to the current state and input signal values. For example, a sequential logic circuit such as a register comprising flip-flops may be employed as the state machine.

The CDFG generator 11, the allocating module 12, the scheduling module 13, the assigning module 14, the data path generator 15, and the control circuit generator 16 are included in a central processing unit (CPU) 1, as shown in FIG. 1.

The behavioral synthesis apparatus shown in FIG. 1 further comprises a storage unit 2, an input unit 4, and an output unit 5. The storage unit 2 comprises a behavior description area 21, a design constraint area 22, a first CDFG area 23, a second CDFG area 24, a third CDFG area 25, an allocation area 26, a schedule area 27, and an RTL description area 28.

The behavior description area 21 stores behavior descriptions of assignment statements, conditional statements, expressions, calculations, function calls and the like. The design constraint area 22 stores design constraints such as constraints on a hardware system for implementing circuit behavior written in the behavior descriptions. Design constraints include circuit area, system clock cycle, intervals between start times of pipeline processing, and the like. The first CDFG area 23, the second CDFG area 24, and the third CDFG area 25 store a first CDFG, a second CDFG, and a third CDFG, respectively, which are generated by the CDFG generator 11. The allocation area 26 stores information of allocated operational units. The schedule area 27 stores scheduling results. The RTL description area 28 stores synthesized RTL descriptions.

The input unit 4 includes a keyboard, a mouse, a light pen, a flexible disk unit or the like. A behavioral synthesis executer may specify and set behavior descriptions and design constraints to be input via the input unit 4. In addition, the output unit 5 includes a display and a printer, which display behavioral synthesis results, or a recording unit, which stores information in a computer readable recording medium. A 'computer readable recording medium' refers to a medium such as an external storage unit for a computer, a semiconductor memory, a magnetic disk, or an optical disk, which may store electronic data. More specifically, a 'computer readable recording medium' may be a flexible disk, a compact disk read only memory (CD-ROM), or a magneto-optics (MO) disk.

FIG. 2 shows an example of a behavior description including multiple loop processing. The behavior description shown in FIG. 2 is written in C language. A main program section scripts a main program including loop processing of a control variable (index) 'i'. The upper limit of a loop processing count is represented by N (N is a natural number.) Loop processing is executed as long as the control variable 'i' is incremented and is smaller than the upper limit N. Loop processing based on the control variable 'i' includes calling functions 'a', 'b', and 'c'. The functions 'a', 'b', and 'c' are defined in a function defining section. Furthermore, as shown in FIG. 2, variable arrays 'x', 'y', 'z', 'f', 'g', and 'h' are defined in a declaration section as arrays having elements, each of which is made from 16 bits including a sign bit, and has a data size equivalent to the upper limit N.

As written in the declaration section, the function 'a' calculates the variable array 'x[i]' by multiplying the variable array 'f[i]' by the variable array 'g[i]'. The function 'b' calculates the variable array 'y[i]' by dividing the variable array 'x[i]' by eight. The function 'c' carries out loop processing based on a control variable 'j' and also carries out calculations: multiplying the variable array 'x[j]' by 'h[j]' and then subtracting the resulting values from a variable array 'y[j]'. In other words, loop processing based on the control variable 'j' is internal loop processing, and the upper limit of a loop processing count is represented by M (M is a natural number.)

A method for generating a CDFG by the CDFG generator 11 is explained before an explanation of a method for carrying out behavioral synthesis by the behavioral synthesis apparatus shown in FIG. 1. As shown in FIG. 1, the CDFG generator 11 includes a first generator 111, a second generator 112, and a third generator 113. The first generator 111 generates a first CDFG based on a behavior description. The second generator 112 generates a second CDFG based on the first CDFG. The third generator 113 generates a third CDFG based on the second CDFG.

Figure 3:
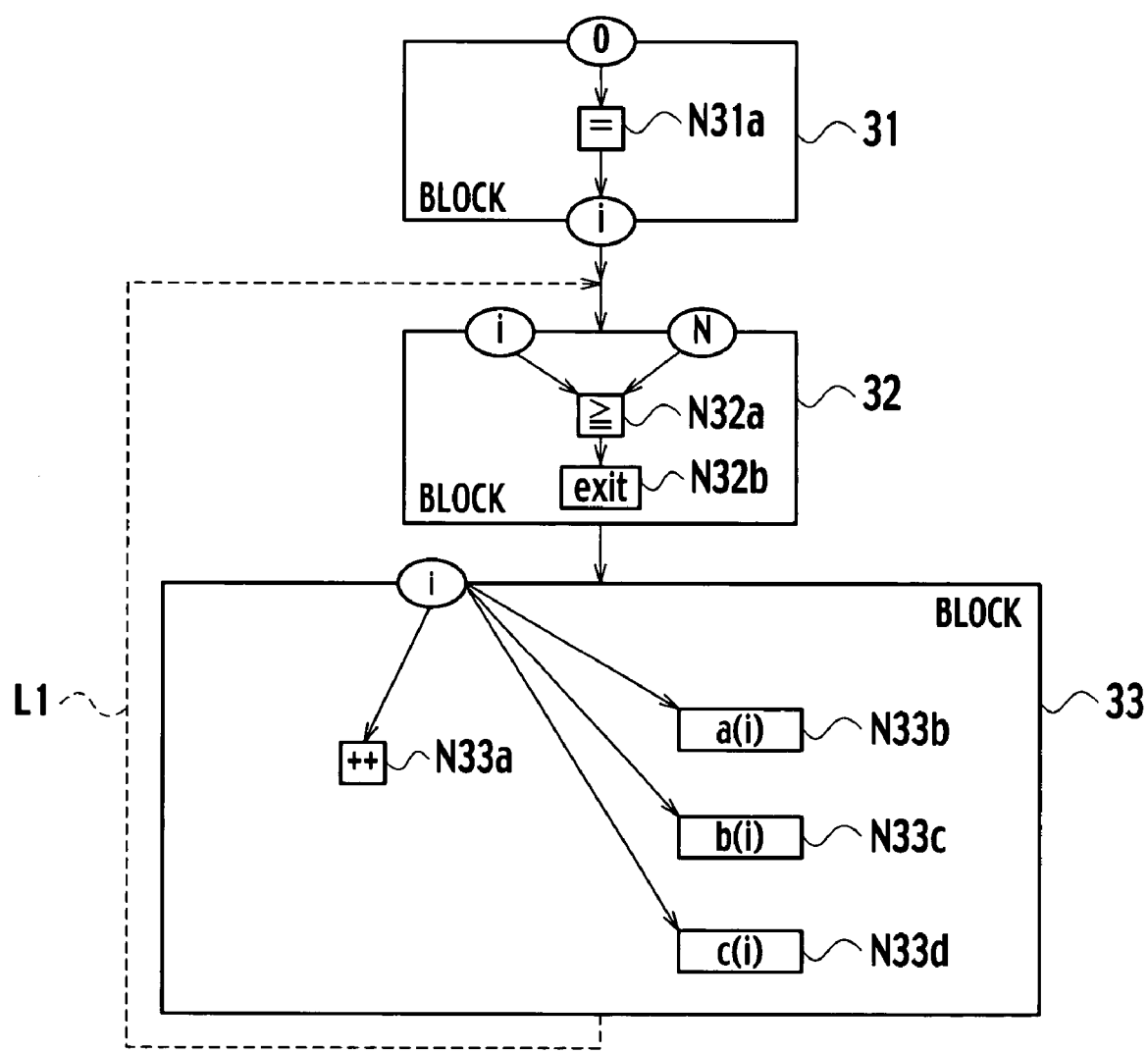
FIG. 3 shows an exemplary first CDFG created by using the automatic behavioral synthesis method, according to the embodiment of the present invention.

An example of the first CDFG, based on the behavior description in FIG. 2, is shown in FIG. 3. The first CDFG is a CDFG prior to expanding the functions 'a', 'b', and 'c'. In FIG. 3, solid line arrows represent branches indicating data flow. Quadrangles connected to the branches, namely quadrangles that receive or transmit data are nodes indicating calculations or function calls. At a node, a calculation is represented by an operator, and a function call is represented by a function call name. In addition, blocks 31, 32, and 33 represent an assignment statement, an expression, loop processing, and the like. Ellipses, which are located at upper edges of the rectangles representing the blocks 31, 32, and 33, represent numerical values or variables, which are input data for the blocks 31, 32, and 33. Hereafter, the ellipses located at upper edges of rectangles are referred to as 'input nodes'. Ellipses located at lower edges of the rectangles representing the blocks 31 represent numerical values or variables, which are output data from the block 31. Hereafter, the ellipses located at lower edges of the rectangles are referred to as 'output nodes'.

In the block 31, an initial value '0' is substituted for the control variable 'i' as shown at a node N31a. In the block 32, the value of the control variable 'i' is compared with the upper limit N as shown at a node N32a. In the block 33, the control variable 'i' is incremented, which is represented by an operator '++', as shown at a node N33a. Furthermore, as shown at nodes N33b and N33c, the functions 'a', 'b', and 'c' that use the control variable 'i' as an argument are called.

As shown with loop processing L1 indicated by a broken line, in order to determine whether or not the control variable 'i' is less than the upper limit N, processing returns to the branch between the block 31 and the block 32 once processing of the block 33 is completed. Processing proceeds to the block 33 when the result from comparing the value of the control variable 'i' with the upper limit N is FALSE or i<N. On the other hand, processing is terminated when the result from comparing the value of the control variable 'i' with the upper limit N is TRUE. In FIG. 3, 'exit' shown at the node N32b indicates termination of processing.

In addition, since the argument for the functions 'a', 'b', and 'c' is the control variable 'i', the control variable 'i' enters the functions 'a', 'b', and 'c' in the block 33.

Data dependency among the functions 'a', 'b', and 'c' is unknown in the first CDFG in FIG. 3. In order to clarify data dependency among the functions 'a', 'b', and 'c', the second generator 112 shown in FIG. 1 carries out in-line expansion of the functions 'a', 'b', and 'c' in the first CDFG in FIG. 3. 'In-line expansion' refers to expanding a function so as to permit a function called from the main program to be executed within the main program. In the related art, loop processing within a function or internal loop processing is also expanded by in-line expansion. However, the second generator 112 does not expand the internal loop processing.

Figure 4:
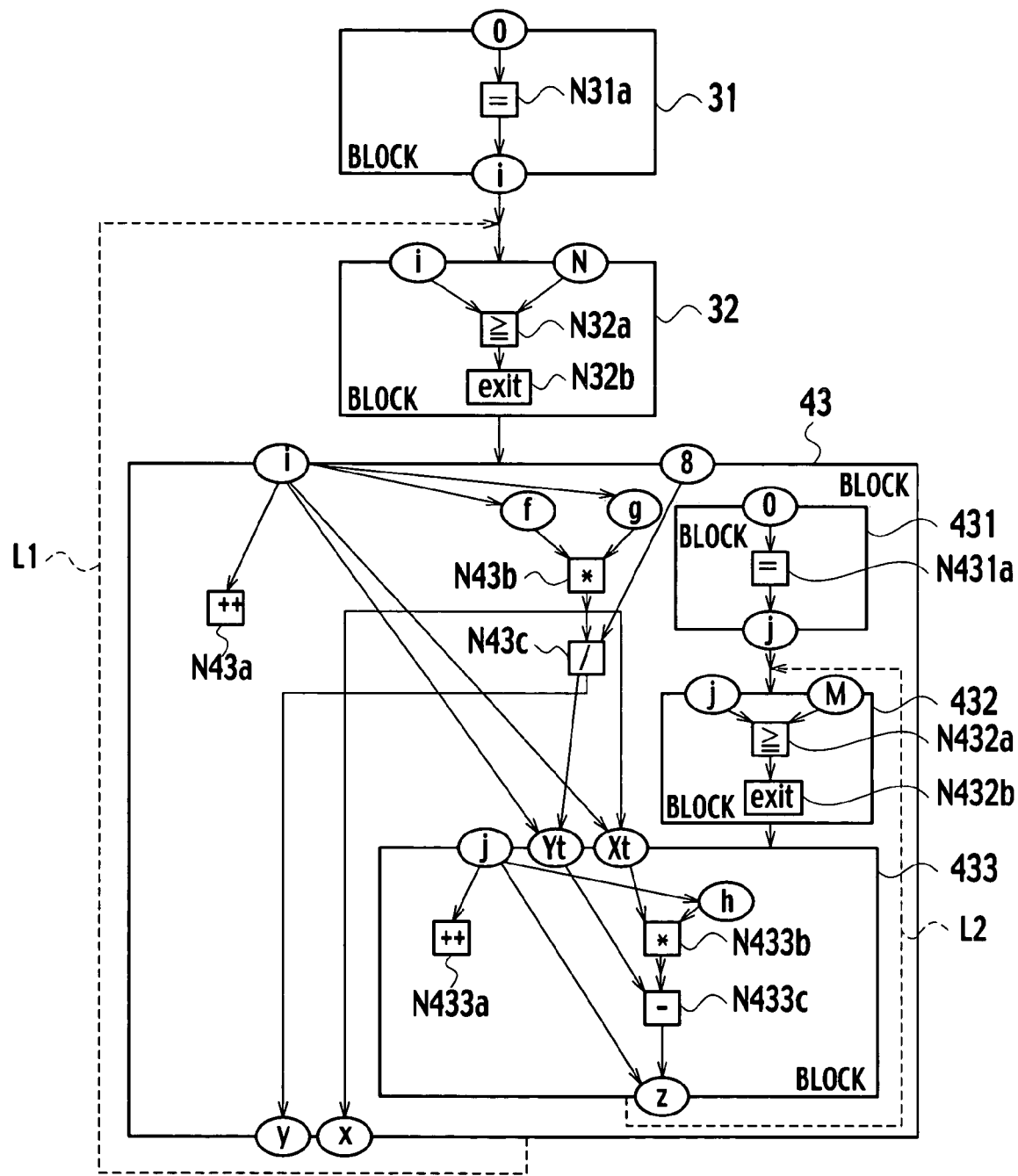
FIG. 4 shows an example of a second CDFG created by using the automatic behavioral synthesis method, according to the embodiment of the present invention.

The second CDFG results from carrying out in-line expansion of the functions 'a', 'b', and 'c' in the first CDFG in FIG. 3, and is shown in FIG. 4. Processing for the functions 'a', 'b', and 'c', and an increment operation '++' of the control variable 'i' are carried out in the block 43. The block 43 shown in FIG. 4 includes blocks 431, 432, and 433 related to processing for the function 'c'. In addition, since the argument for the variable arrays 'f' and 'g' is the control variable 'i', the control variable 'i' enters the variable arrays 'f' and 'g' in the block 43. The variable array 'f' and the variable array 'g' corresponding to the function 'a' are then multiplied, as shown at a node N43b. Next, the results of the calculation indicated at the node N43b enter a node N43c in which calculation for the function 'b' is then executed.

The results of the calculation shown at the node N43b enter an input node Xt of the block 433 and an output node x of the block 43. The results of the calculation shown at the node N43c enter an input node Yt of the block 433 and an output node y of the block 43. The control variable 'i' enters the input nodes Xt and Yt. The control variable 'j' enters the variable array 'h' in the block 433. Processing for the function 'c' is then carried out in the block 433. Processing results provided in the block 433 are transmitted to the output node x of the block 433. Values at the output nodes x and y of the block 43 and the output node z of the block 433 correspond to values of the respective variable arrays 'x', 'y', and 'z' used in the function 'c'.

Furthermore, as shown with loop processing L2 indicated by a broken line within the block 43, in order to determine whether or not the control variable 'j' is less than the upper limit M, processing returns to the branch between the block 431 and the block 432 once processing of the block 433 is completed. In other words, the loop processing L2 is internal loop processing of the loop processing L1. Processing proceeds to the block 433 when the result from comparing the value of the control variable 'j' with the upper limit M in the block 432 is FALSE or j<M. On the other hand, processing is terminated when the result from comparing the value of the control variable 'j' with the upper limit M is TRUE.

The third generator 113 in FIG. 1 traces the branches from the respective input nodes of the blocks 31, 32, 43, 431, 432, and 433, shown in FIG. 4, to extract nodes not connected to an output node. Hereafter, the nodes not connected to an output node are referred to as 'independent nodes'. As a result, the node N43a of the block 43 and the node N433a of the block 433 are extracted as independent nodes. Outputs of calculations at the independent nodes are not used in the blocks that include such independent nodes. Therefore, calculations at the independent nodes may be executed independently from other calculations within those blocks. For example, a calculation of incrementing the control variable 'i' shown at the node N43a of the block 43 may be executed between the block 32 and the block 43 by substituting a calculation 'i+1' for the operation at the node N43a. In other words, the CDFG may be modified so as to make a block with an independent calculation of incrementing the control variable 'i'. Similarly, the calculation of incrementing the control variable 'j' shown at the node N433a of the block 433 may be executed between the block 432 and the block 433 by substituting a calculation 'j+1' for the operation at the node N433a. In other words, the third generator 113 extracts a node indicating an independent calculation executable in a block as an independent node.

Figure 5:
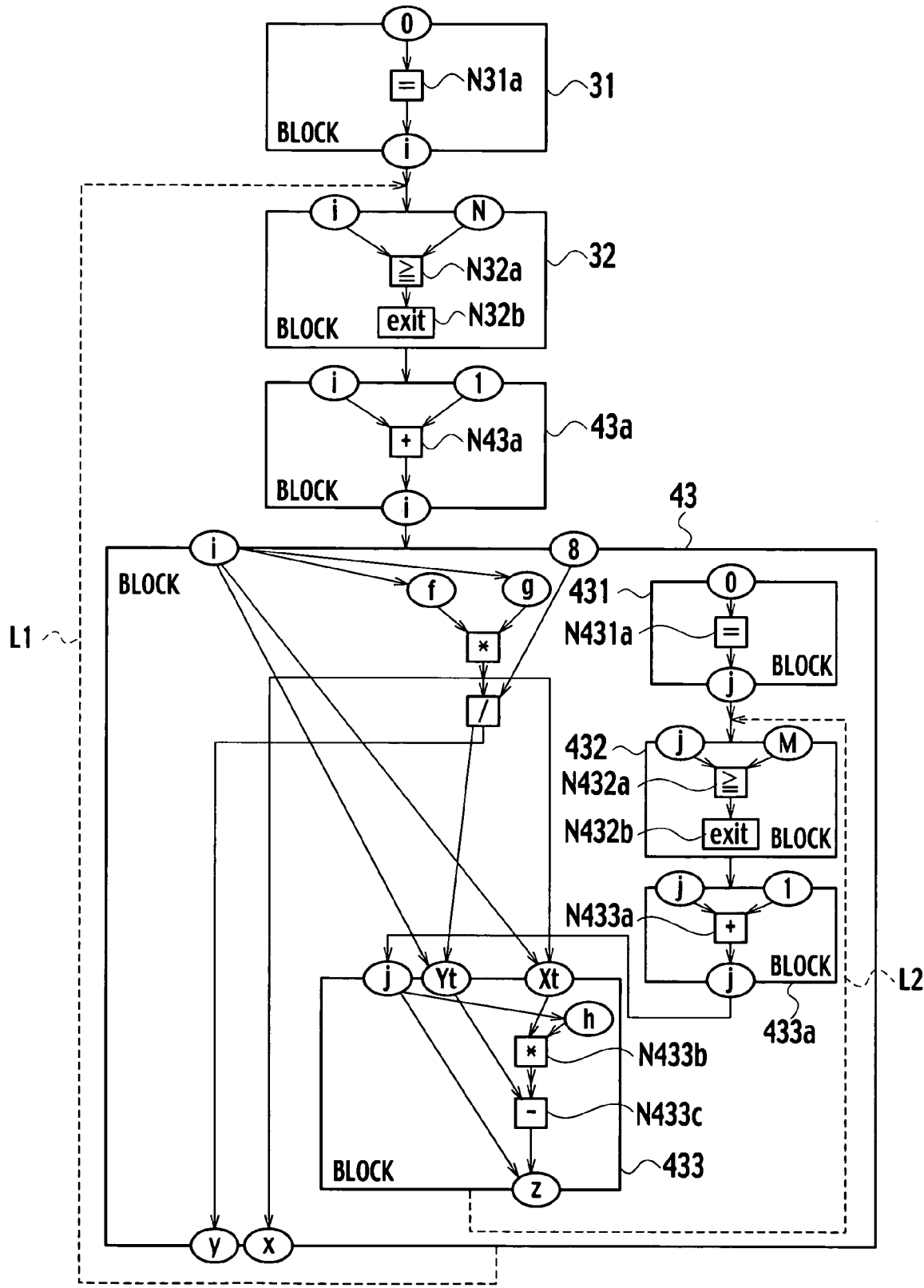
FIG. 5 shows an example of a third CDFG created by using the automatic behavioral synthesis method, according to the embodiment of the present invention.

The third generator 113 in FIG. 1 makes a block with an independent calculation at the independent node of the second CDFG, thereby generating the third CDFG. The third CDFG generated by the third generator 113, based on the second CDFG in FIG. 4, is shown in FIG. 5. The block 43a in FIG. 5 is a block with an independent calculation at the node N43a of the block 43 shown in FIG. 4. The calculation 'i+1' is executed in the block 43a. Furthermore, the block 433a is a block with an independent calculation at the node N433a of the block 433 shown in FIG. 4. The calculation 'j+1' is executed in the block 433a.

As described above, the third CDFG including the loop processing L2, which is internal loop processing, is generated by the CDFG generator 11 shown in FIG. 1. As shown in FIG. 5, in the third CDFG, independent calculations of incrementing the control variable 'i' of the loop processing L1 and the control variable 'j' of the loop processing L2 are executed in the respective blocks 43a and 433a.

Figure 6:
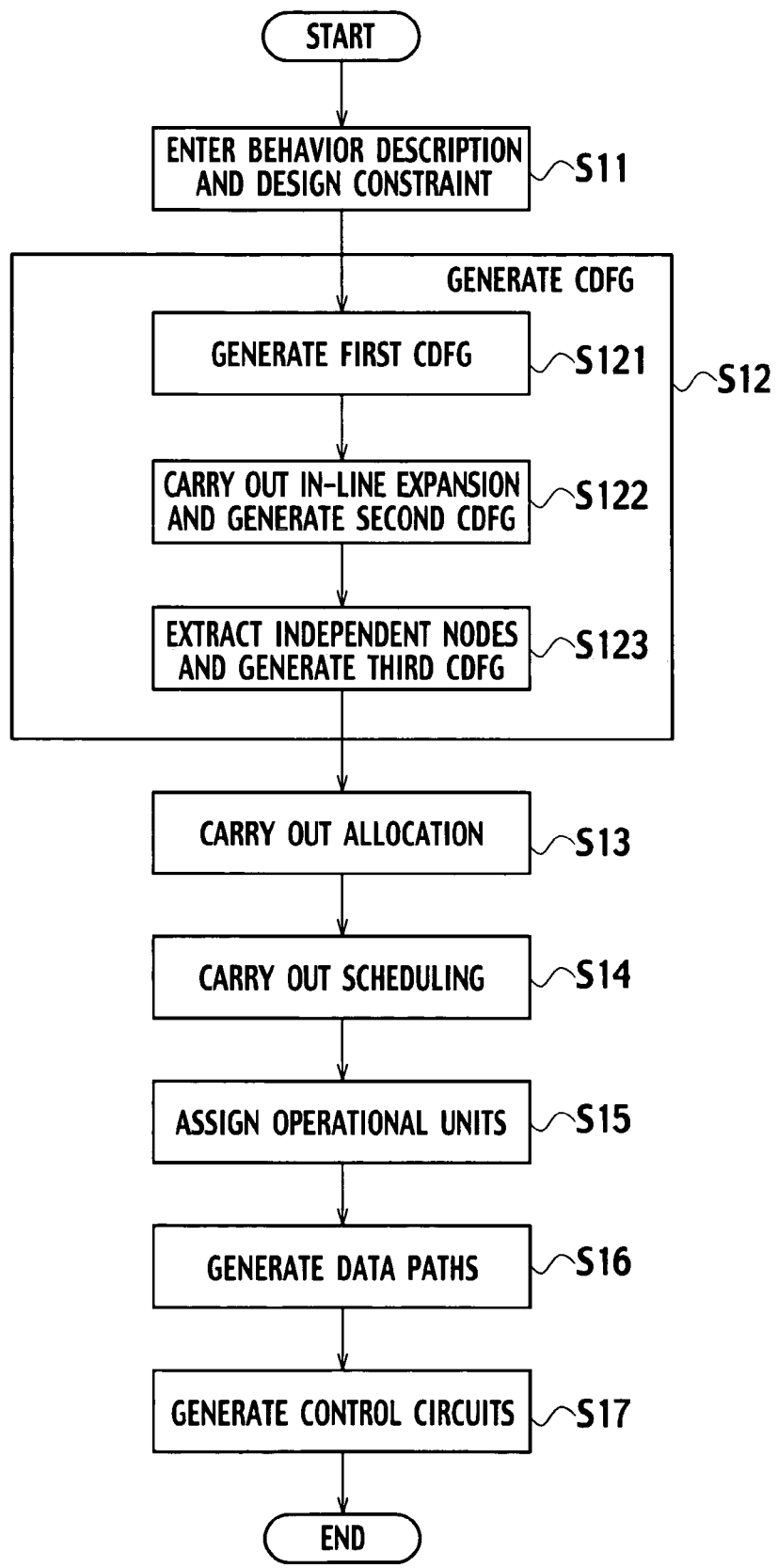
FIG. 6 is a flowchart explaining the automatic behavioral synthesis method, according to the embodiment of the present invention.

Next, an example of method for carrying out behavioral synthesis using the behavioral synthesis apparatus shown in FIG. 1 is described using the flowchart in FIG. 6. In the following explanation, an example of synthesizing RTL descriptions based on the behavior description shown in FIG. 2 is described.

In a step S11, the behavior description shown in FIG. 2 is stored in the behavior description area 21 via the input unit 4 of FIG. 1. In addition, design constraints are stored in the design constraint area 22.

In a step S12, the CDGF generator 11 reads the behavior description from the behavior description area 21. The CDFG generator 11 generates a CDFG without expanding internal loop processing, based on the behavior description using the method described above. In other words, in a step S121, the first generator 111 generates a first CDFG shown in FIG. 3, based on the behavior description. The generated first CDFG is stored in the first CDFG area 23. In a step S122, the second CDGF generator 112 reads the first CDFG from the first CDFG area 23. The second generator 112 generates a second CDFG shown in FIG. 4 by in-line expansion of the first CDFG without expanding the internal loop processing. The generated second CDFG is stored in the second CDFG area 24. In a step S123, the third CDFG generator 113 reads the second CDFG from the second CDFG area 24. The third generator 113 extracts independent nodes from the second CDFG, generating a third CDFG shown in FIG. 5. The generated third CDFG is stored in the third CDFG area 25.

In a step S13, the allocating module 12 reads the design constraints from the design constraint area 22. The allocating module 12 carries out allocation by extracting hardware, such as an operational unit, register, memory or the like, with a shorter processing time than the system clock cycle. The hardware is extracted from the technology library 3, based on the design constraints. Information of the allocated hardware (hereafter referred to as 'allocation information') is stored in the allocation area 26. FIG. 7 shows an example of information of allocated hardware. For example, an operational unit ADD 16S, which adds signed 16-bit values, carries out processing corresponding to an operator '+' written in the behavior description. Signal delay due to the calculation of the operational unit ADD 16S is 8 ns, and the size of the operational unit ADD 16S is ten. Here, 'size' refers to the relative size of each operational unit. Therefore, in the case of using multiple operational units having the same function, the smallest operational unit, for example, may be selected. Furthermore, an operational unit 'Rd_xa' corresponds to reading from the variable array 'x' and is written as a right side member 'x[i]' of an operator '=' in the behavior description. Furthermore, an operational unit 'Wt_xa' corresponds to writing to the variable array 'x' and is written as a left side member 'x[i]' of the operator '=' in the behavior description. In other words, reading (input) from a variable array and writing (output) to a variable array are treated as calculations for allocation. Note that with the following description, the variable arrays 'x', 'y', 'z', 'f', 'g', and 'h' are assumed to be allocated to a random access memory (RAM). The arguments for the respective variable arrays 'x', 'y', 'z', 'f', 'g', and 'h' correspond to respective addresses indicating locations where data is stored in the RAM.

In a step S14, the scheduling module 13 reads the third CDFG from the third CDFG area 3 and allocation information from the allocation area 26. The scheduling module 13 carries out scheduling for the third CDFG, based on the allocation information. Scheduling results are stored in the schedule area 27. The scheduling results are shown in FIGS. 8 through 11. FIGS. 8 through 11 show behavioral steps in which operational units operate for respective operators in the third CDFG. FIG. 8 shows an example of carrying out scheduling for the blocks 31, 32, and 43a. In a behavioral step ST101, a calculation at the node N31a indicated by the operator '=' is executed by an operational unit 'Write_0'. The operational unit 'Write_0' indicates a calculation of substituting zero for the content of a variable. In addition, in a behavioral step ST102, calculations at the node N32a indicated by the operator '≧' and the node N43a indicated by the operator '+' are executed by operational units 'GE 16S' and 'ADD 16S', respectively. FIG. 9 shows an example of carrying out scheduling for the block 43. As shown in FIG. 9, calculations at respective nodes of the block 43 are executed in behavioral steps ST110 through ST113. FIG. 10 shows results of carrying out scheduling for the blocks 431, 432, and 433a. A calculation at the node of the block 431 is executed in a behavioral step ST120. Calculations at respective nodes of the blocks 432 and 433a are executed in a behavioral step ST121. FIG. 11 shows an example of carrying out scheduling for the block 433. As shown in FIG. 11, calculations at respective nodes of the block 433 are executed in behavioral steps ST130 through ST133.

In a step S15, the assigning module 14 reads the third CDFG from the third CDFG area 3 and scheduling results from the schedule area 27. The assigning module 14 assigns operational units shown in FIGS. 8 through 11 to respective operators written in the third CDFG. The assignment of operational units takes into account the size (bit width) of data input and output of the operational units. The assigning module 14 assigns registers to branches in the third CDFG in order to store data between behavioral steps. Furthermore, the assigning module 14 divides first pipeline processing for implementing the loop processing L1 and second pipeline processing for implementing the loop processing L2 into multiple stages, based on pipeline pitch constraints set as a design constraint. In other words, the first pipeline processing and the second pipeline processing are divided so that processing in each stage is completed within a single pipeline pitch. The pipeline pitch constraints are set for each of the first pipeline processing and the second pipeline processing. The assigning module 14 assigns pipeline registers to the loop processing L1 and the loop processing L2 in order to store data transferred among the respective stages of the first pipeline processing and the second pipeline processing. Therefore, the assigning of pipeline registers is carried out by tracing the flow of the data transferred among stages.

In a step S16, the data path generator 15 generates data paths mutually connecting the operational units and the registers assigned to the third CDFG in the step S15. Furthermore, the data path generator 15 generates selectors so as to share the registers. Afterwards, in a step S17, the control circuit generator 16 generates a control circuit to control execution of processing in each behavioral step, thereby completing behavioral synthesis of the RTL descriptions. The control circuit generator 16 generates two control circuits for controlling the first pipeline processing and the second pipeline processing, respectively. The synthesized RTL descriptions are stored in the RTL description area 28.

The RTL descriptions stored in the RTL description area 28 may be transferred from the behavioral synthesis apparatus via the output unit 5.

There are cases where the operational unit extracted from the technology library 3 fail to satisfy design constraints in the step S13. In such case, for example, new executable operational units are generated and stored in the technology library 3. Scheduling is then carried out using the newly generated operational units.

Figure 12:
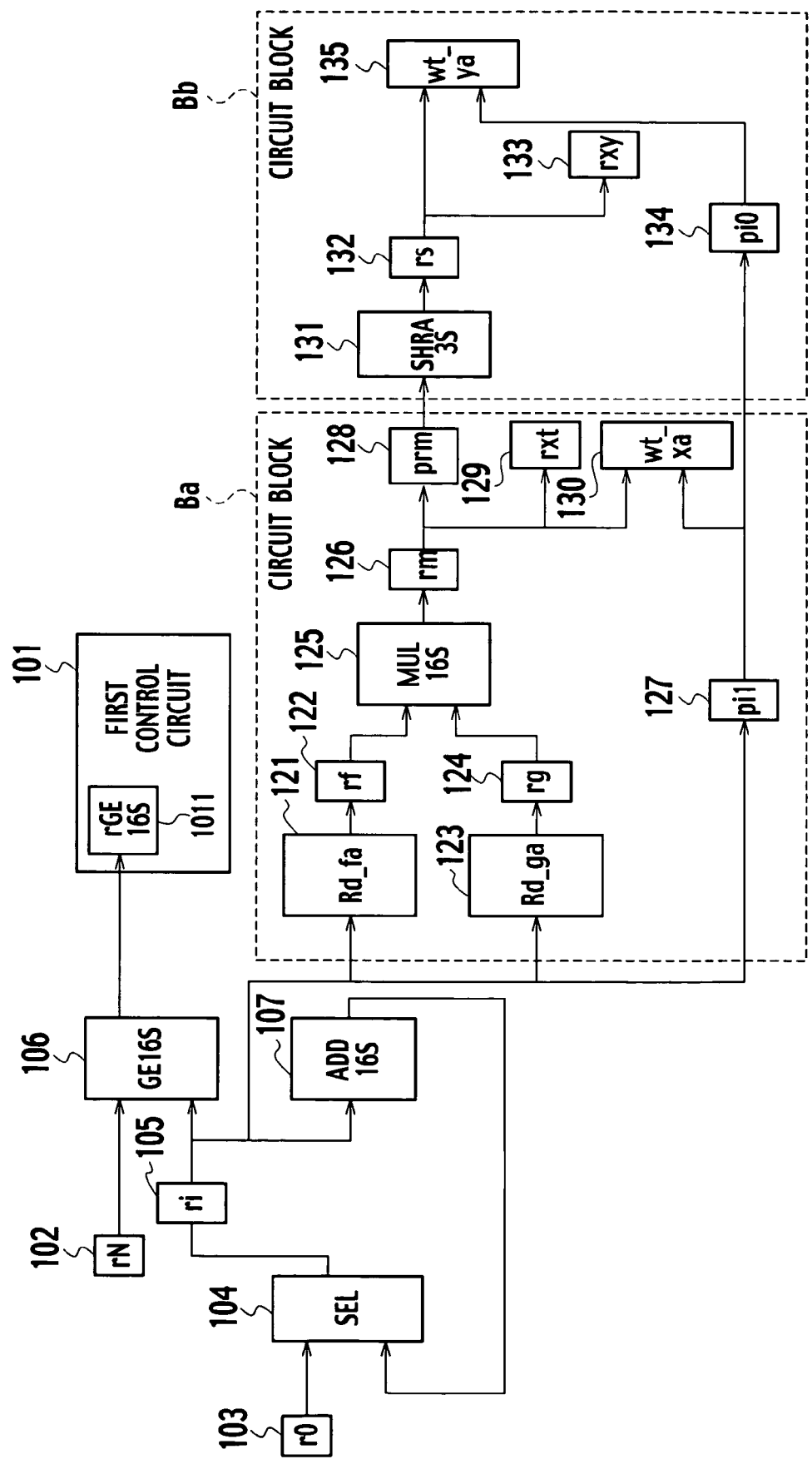
FIG. 12 is an example of a block diagram of a logic circuit generated using the automatic behavioral synthesis method, according to the embodiment of the present invention.
Figure 13:
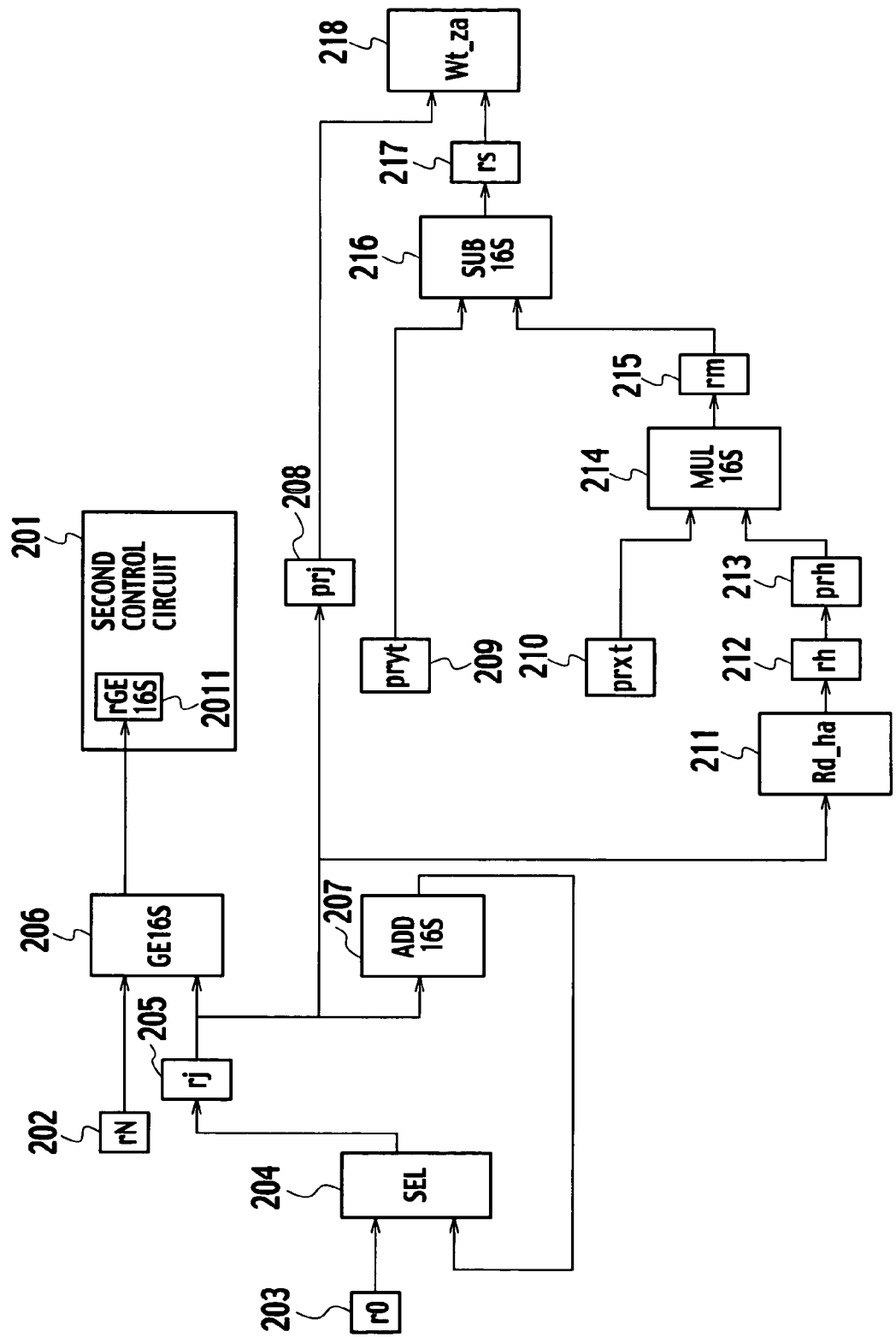
FIG. 13 is an example of a block diagram of a logic circuit generated using the automatic behavioral synthesis method, according to the embodiment of the present invention.

Examples of block diagrams of generated logic circuits, based on the RTL descriptions resulting from behavioral synthesis of the method described above, are shown in FIGS. 12 and 13. In FIGS. 12 and 13, circuit blocks denoted as beginning with 'r' are registers. For example, a circuit block 'ri' is a register configured to store the value of the control variable 'i'. In addition, a circuit block 'rGE 16S' stores calculation results of an operational unit 'GE 16S'. A circuit block 'rm' stores a calculation result m of the operational unit 'GE 16S'. A circuit block 'rs' stores a calculation result s of an operational unit 'SHRA 3S'.

In FIGS. 12 and 13, a circuit block 'SEL' is a selector. The variable arrays are allocated to a RAM as mentioned before, for example, a circuit block 'Wt_za' indicates an address decoder and data input processing for writing data in RAM 'z'. In addition, values read from the RAM 'z' are stored in a register. For example, a circuit block 'rf' is a register, which stores values of a variable array 'f' read from the RAM 'z'. The RAM is omitted in FIGS. 12 and 13. Circuit blocks denoted as beginning with 'pr' are pipeline registers. Note that the block diagrams in FIGS. 12 and 13 omit register bit widths for simplicity of the description.

FIG. 12 shows an example of a block diagram of the logic circuit that was generated based on the scheduling results shown in FIGS. 8 and 9. In FIG. 12, a pipeline register 128 maintains processing results of a circuit block Ba, which carries out the processing of a function 'a'. Data stored in the pipeline register 128 is used as input of a circuit block Bb, which carries out the processing of a function 'b'. Control registers 127 and 134 are configured to store the value of the control variable 'i'. However, a value resulting from adding '1' to the value stored in the control register 134 is stored in the register 127. Use of the pipeline register 128 and the control registers 127 and 134 permits processing of the circuit blocks Ba and Bb as the first pipeline processing. Each circuit block shown in FIG. 12 is controlled by a first control circuit 101. In other words, the first control circuit 101 controls the first pipeline processing.

FIG. 13 shows a block diagram of a logic circuit that is generated based on the scheduling results given in FIGS. 10 and 11. In other words, the logic circuit shown in FIG. 13 executes the loop processing L2. Stage division of the second pipeline processing, which implements the loop processing L2, is carried out as division of repeated processing in the block 433 shown in FIG. 5, based on information of the behavioral steps shown in FIG. 11. First, behavioral steps are located that permit parallel processing when carrying out repeated processing in the block 433. Processing is divided among the behavioral steps so as to satisfy the pipeline pitch constraints. Each circuit block shown in FIG. 13 is controlled by a second control circuit 201. In other words, the second control circuit 201 controls the second pipeline processing.

Data generated through the loop processing L1 executed by the logic circuit shown in FIG. 12 is used in the loop processing L2 executed by the logic circuits in FIG. 13. Therefore, the data generated through the loop processing L1 is stored in transfer registers 129 and 133 shown in FIG.

12. The transfer register 129 stores a calculation result m stored in a register 126. The transfer register 133 stores a calculation result s stored in a register 132. The values stored in the respective transfer registers 129 and 133 are transferred to respective pipeline registers 209 and 210 shown in FIG. 13. In other words, the pipeline registers 209 and 210 store the data generated through the loop processing L1 executed by the circuits in FIG. 12. The data stored in the pipeline registers 209 and 210 are used as input data for the loop processing L2. The transfer registers 129 and 133 are assigned to the processing for transferring the results of the external loop processing (the loop processing L1) to the internal loop processing (the loop processing L2) by the assigning module 14.

The case of executing a behavioral step in a single system clock cycle is described forthwith as an example of setting intervals. As shown in FIG. 11, reading from the variable arrays 'x', 'y', and 'h' is carried out in the behavioral step ST130. Furthermore, multiplication, subtraction, and writing to the variable array 'z' are carried out in the behavioral steps ST131 through ST133. Here, a stage in which processing in the behavioral step ST130 is carried out is referred to as 'stage C1', and a stage in which processing in the behavioral steps ST131 through ST113 is carried out is referred to as 'stage C2'. Two system clock cycles are necessary for processing by the operational unit 'Wt_za' shown in FIG. 11. Accordingly, since multiplication and subtraction respectively require one system clock cycle, and writing to the variable array 'z' requires two system clock cycles, the pipeline pitch for the stage C2 is three system clock cycles. Therefore, the processing in the block 433 in FIG. 5 cannot be carried out as pipeline processing in less than three system clock cycles. As a result, three system clock cycles is set to the interval.

An exemplary behavior of the logic circuit shown in FIG. 13 is described below. For example, while carrying out a calculation with the control variable 'j', stored in a register 205 having a value of one during the stage C2 and the value of a pipeline register 208 being zero, reading from the variable arrays 'x', 'y', and 'h' in the stage C1 is carried out with j=1. To use processing results of the stage C1 in the stage C2, pipeline registers 208 and 213 are generated to store the processing results of the stage C1, as shown in FIG. 13. The pipeline register 208 stores the value of the control variable 'j'. The pipeline register 213 stores data read from RAM 'h'. Therefore, the pipeline register 208 is inserted after the register 205, which stores the value of the control variable 'j'. Furthermore, the pipeline register 213 is inserted after the register 212, which stores the data read from the RAM 'h'.

As described above, use of the pipeline registers 208, 209, 210, and 213 permits execution of a processing series as the second pipeline processing, i.e., data read from the transfer registers 129 and 133 and the RAM 'h' (rd_ha') multiplication by a multiplier MUL16S, and subtraction by a subtracter SUB 16S.

An example of an RTL description generated by the control circuit generator 16 is described forthwith using FIG. 14. FIG. 14 shows an example of script for controlling the operation of the circuit blocks shown in FIG. 13. The script is constituted by conditional statements written by use of the hardware description language (HDL). Unconditional processing shown in FIG. 14 is carried out at the same time. 'Unconditional processing' refers to processing between 'then' and 'else' in an 'if' statement. In FIG. 14, signals 'Step_state' are signals indicating behavioral steps shown in FIGS. 10 and 11. Signals 'cntrl_x' are control signals for the circuit blocks in FIG. 13. Note that for simplicity of description, descriptions of the initial state and substitution of initial values for respective signals are omitted in FIG. 14.

FIG. 15 shows an example of script of pipeline processing control written with the same conditional statements as in FIG. 14. In FIG. 15, symbols 'STGC1' and 'STGC2' denote the stage C1 and the stage C2, respectively.

The circuit blocks in FIG. 13 carrying out the loop processing L2 are set after the circuit blocks in FIG. 12, which carry out the loop processing L1. In addition, the second control circuit 201 shown in FIG. 13 is controlled by the first control circuit 101 shown in FIG. 12. Furthermore, as already mentioned, the data stored in the respective transfer registers 129 and 133, shown in FIG. 12, is used in the second pipeline processing in FIG. 13. Therefore, the transfer register 129 in FIG. 12 and the pipeline register 210 in FIG. 13 are connected to each other so as to transfer the data stored in the transfer register 129 to the pipeline register 210. Furthermore, the transfer register 133 in FIG. 12 and the pipeline register 209 in FIG. 13 are connected to each other so as to transfer the data stored in the transfer register 133 to the pipeline register 209.

As described above, the pipeline registers 209 and 210, which store the variable arrays and are used in the loop processing L2 (internal loop processing), are generated using the automatic behavioral synthesis method shown in FIG. 6. Moreover, necessary data for the second pipeline processing implementing the loop processing L2 is read from pipeline registers generated as temporary storage units instead of from a memory, such as a RAM. Thus, the time required for execution of the loop processing L2 is reduced.

The assigning module 14 generates pipeline registers that store processing results of respective stages, based on a design constraint of the minimum number of system clock cycles required for processing in respective stages, or based on values specified by a user. In addition, the assigning module 14 inserts the generated pipeline registers in the circuit.

Figures 16, 17:
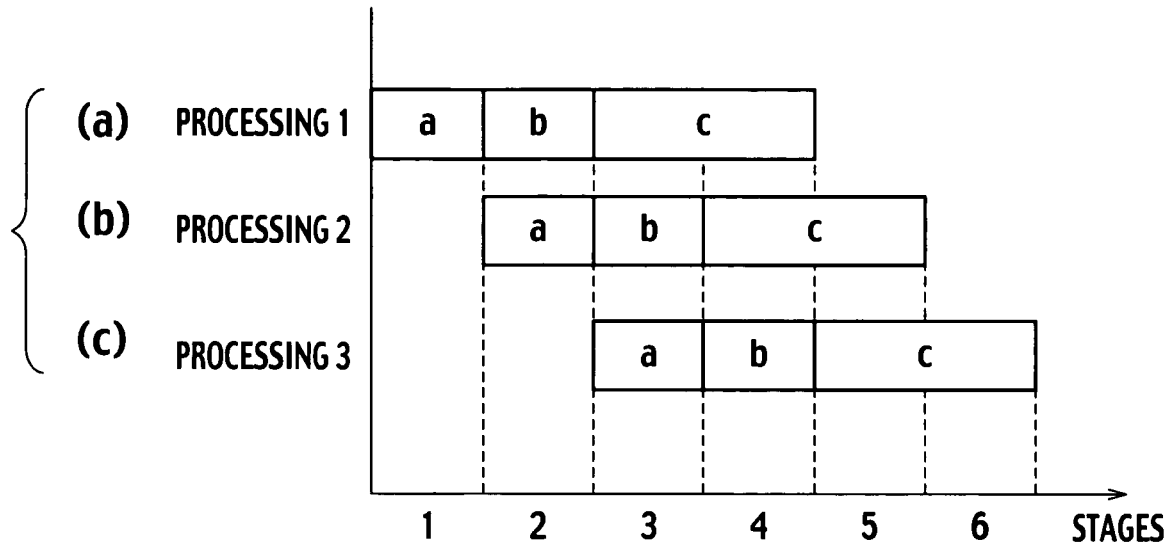
FIG. 16 shows examples of pipeline processing executed by a circuit generated using the automatic behavioral synthesis method according to the embodiment of the present invention.
FIG. 17 shows an exemplary expansion of a loop processing description.

An example of executing the functions 'a', 'b', and 'c' in FIG. 2 by pipeline processing is shown in FIG. 16. As shown in FIG. 16, the assigning module 14 divides the first pipeline processing so as to execute the process defined by the functions 'a', 'b', which are called in the loop processing L1, within a single stage. Processing of the function 'a' includes reading data from a RAM, multiplying, writing data to a register, and transferring data to a pipeline register. Therefore, the processing of the function 'a' requires at least three system clock cycles. Accordingly, the pipeline pitch of the necessary pipeline processing for the function 'a' is at least three system clock cycles. The pipeline pitch of the pipeline processing for the function 'b' is set to three system clock cycles in order to coordinate with the pipeline pitch of the pipeline processing for the function 'a'. The assigning module 14 generates pipeline registers store results of the first pipeline processing. Accordingly, the pipeline registers 210 and 209 are generated as pipeline registers that store results of the functions 'a' and 'b'.

As already mentioned, the function 'c' is divided into the stage C1 and the stage C2 and then executed. More specifically, reading data ('rd_ha') is carried out in the stage C1, and multiplication by the multiplier MUL16S and subtraction by the subtracter SUB16S are executed in the stage C2. As already described above, the pipeline pitch in the stage C2 is three system clock cycles. Here, setting three system clock cycles to the pipeline pitch of the stage C1 allows the pipeline pitch of the second pipeline processing for the stages C1 and C2 to be consistent with the pipeline pitch of the first pipeline processing for the functions 'a' and 'b'.

In the example in FIG. 16, the function 'a' of processing 1 is executed in stage 1. The function 'b' of the processing 1 and the function 'a' of processing 2 are executed in stage 2. The first half of the function 'c' of the processing 1, the function 'b' of the processing 2, and the function 'a' of processing 3 are executed in stage 3. In other words, for the first and the second pipeline processing, processing described in the behavior description is divided and executed by overlapping the resulting divided pieces of processing. As a result, the overall processing time may be shortened.

For comparison with the embodiment of the present invention, an example of expanding, including internal loop processing of the function 'c' shown in FIG. 2, is given below. Since the upper limit M for the control variable 'j' in the internal loop processing is ten, the function 'c' is expanded as ten calculations, as shown in FIG. 17. Based on a description shown in FIG. 17, a CDFG having ten multiplications and ten subtractions is generated. In other words, expansion of the internal loop processing increases the size of the CDFG and number of operators. Therefore, the time required for scheduling and resource assigning increases. Furthermore, the number of behavioral steps after scheduling increases, complicating the control circuits. Moreover, since pipeline processing is not carried out, it is difficult to improve circuit processing speed.

Setting stricter restrictions on latency as a design rule allows synthesis of circuits executing the description in FIG. 17 in two system clock cycles. However, the synthesized circuit requires ten multipliers and ten subtracters, and has a large area.

The circuit shown in FIG. 13 synthesized by the automatic behavioral synthesis method in FIG. 6 includes a single multiplier and a single subtracter with a latency of five system clock cycles. On the other hand, a circuit synthesized according to the description in FIG. 17, with a latency design constraint of five system clock cycles, requires at least two multipliers and two subtracters. In other words, one multiplier and one subtracter more than in the circuit shown in FIG. 13 are needed.

As described above, the behavioral synthesis apparatus according to the embodiment of the present invention improves working speed of the synthesized circuit by generating a CDFG without expanding internal loop processing. In addition, the behavioral synthesis apparatus according to the embodiment of the present invention does not use as many operational units in the circuit. As a result, an increase in circuit area may be controlled.

A series of behavioral synthesis operations shown in FIG. 6 may be carried out by controlling the behavioral synthesis apparatus, shown in FIG. 1, by use of a program algorithm equivalent to that of FIG. 6. Such program should be stored in the storage unit 2 of the behavioral synthesis apparatus in FIG. 1. In addition, a series of behavioral synthesis operations of the present invention may be carried out by storing such a program in a computer-readable recording medium and instructing the storage unit 2, shown in FIG. 1, to read the recording medium.

OTHER EMBODIMENTS

A case of two processing loops is given in the description of the embodiment described above, three or more loops may be utilized in the present invention. Furthermore, while the case of 'for loop' statements written in C language has been described, the present invention may also be applied to 'while loop' statements and 'do_while loop' statements including 'wait ( )' processing written in an expanded version of C (C++) language. Moreover, although the example of where a two-level hierarchy of the functions written in the behavior description has been described, three or more level hierarchy is also possible.

Various modifications will become possible for those skilled in the art after receiving the teachings of the present disclosure without departing from the scope thereof.

What is claimed is:

1. A behavioral synthesis apparatus comprising:
a control data flow graph generator configured to generate a control data flow graph specifying an execution order of a plurality of calculations written in a behavior description, including an external loop processing that includes an internal loop processing, without expanding the internal loop processing;
a scheduling module configured to carry out scheduling of the plurality of calculations, based on the control data flow graph; and
an assigning module configured to divide a first pipeline processing, which implements the external loop processing, and a second pipeline processing, which implements the internal loop processing, into a plurality of stages, based on scheduling results, and to assign a plurality of pipeline registers that store data transferred among the plurality of stages to the external loop processing and the internal loop processing.

2. The apparatus of claim 1, wherein the assigning module divides the first pipeline processing so as to execute a process defined by a function within one of the plurality of stages, the function is called in the execution of the external loop processing.

3. The apparatus of claim 1, wherein the assigning module assigns a transfer register storing results of the external loop processing used in the internal loop processing, to the processing for transfer of results of the first pipeline processing to the second pipeline processing.

4. The apparatus of claim 1, wherein the assigning module divides the first pipeline processing and the second pipeline processing into the plurality of stages, based on pipeline pitch constraints set for each of the first pipeline and the second pipeline processing.

5. The apparatus of claim 1, wherein the control data flow graph generator comprises:
a first generator configured to generate a first CDFG based on the behavior description;
a second generator configured to generate a second CDFG by expansion of functions in the first CDFG without expanding the internal loop processing; and
a third generator configured to generate a third CDFG as the control data flow graph, the third CDFG includes blocks in which calculations of incrementing a control variable for the internal loop processing and the external loop processing are executed, based on the second CDFG.

6. The apparatus of claim 1, further comprising:
a control circuit generator configured to generate a first control circuit and a second control circuit for controlling the first pipeline processing and the second pipeline processing, respectively.

7. The apparatus of claim 1, further comprising:
a technology library configured to store information of a plurality of hardware.

8. The apparatus of claim 7, further comprising:
an allocating module configured to extract a hardware that satisfies a design constraint based on information stored in the technology library.

9. The apparatus of claim 8, wherein the design constraint includes a system clock cycle of a system which implements circuit behaviors written in the behavior description.

10. The apparatus of claim 8, wherein the assigning module assigns a plurality of hardware, extracted by the allocating module, to the control data flow graph.

11. The apparatus of claim 10, further comprising:
a data path generator configured to generate a data path mutually connecting the hardware.

12. A computer implemented behavioral synthesis method comprising:
generating a control data flow graph specifying an execution order of a plurality of calculations written in a behavior description, including an external loop processing that includes an internal loop processing, without expanding the internal loop processing;
carrying out scheduling of the plurality of calculations based on the control data flow graph;
dividing a first pipeline processing, which implements the external loop processing, and a second pipeline processing, which implements the internal loop processing, into a plurality of stages, based on scheduling results; and
assigning a plurality of pipeline registers, which store data transferred among the plurality of stages, to the external loop processing and the internal loop processing.

13. The method of claim 12, wherein the first pipeline processing is divided so as to execute a process defined by a function within one of the plurality of stages, the function is called in the execution of the external loop processing.

14. The method of claim 12, further comprising:
assigning a transfer register, which stores results of the external loop processing used in the internal loop processing, to the processing for transfer results of the first pipeline processing to the second pipeline processing.

15. The method of claim 12, wherein the first pipeline processing and the second pipeline processing are divided into the plurality of stages, based on pipeline pitch constraints set for each of the first pipeline processing and the second pipeline processing.

16. The method of claim 12, wherein generating a control data flow graph comprises:
generating a first CDFG based on the behavior descriptions; and
generating a second CDFG by expanding functions in the first CDFG without expanding the internal loop processing,
wherein generation of the control data flow graph includes generating blocks in which calculations of incrementing a control variable for the internal loop processing and the external loop processing are executed, based on the second CDFG.

17. The method of claim 12, further comprising:
generating a first control circuit and a second control circuit for controlling the first pipeline processing and the second pipeline processing, respectively.

18. The method of claim 12, further comprising:
extracting hardware that satisfies a design constraint, based on information stored in a technology library storing information of a plurality of types of hardware.

19. The method of claim 18, wherein the design constraint includes a system clock cycle of a system which implements circuit behaviors written in the behavior description.

20. A computer program product comprising a computer readable medium configured to be executed by a computer for synthesizing circuits from a behavioral description, comprising:
instructions configured to generate a control data flow graph specifying an execution order of a plurality of calculations written in a behavior description, including an external loop processing that includes an internal loop processing, without expanding the internal loop processing;
instructions configured to carry out scheduling of the plurality of calculations, based on the control data flow graph;
instructions configured to divide a first pipeline processing, which implements the external loop processing, and a second pipeline processing, which implements the internal loop processing, into a plurality of stages, based on scheduling results; and
instructions configured to assign a plurality of pipeline registers, which store data transferred among the plurality of stages, to the external loop processing and the internal loop processing.

* * * * *